US012128720B2

(12) United States Patent
Shiu et al.

(10) Patent No.: US 12,128,720 B2
(45) Date of Patent: Oct. 29, 2024

(54) HITCHES AND CONNECTIONS FOR AUTOMATED GUIDED VEHICLE

(71) Applicant: United States Postal Service, Washington, DC (US)

(72) Inventors: Leung Man Shiu, Gaithersburg, MD (US); Edward F. Houston, Bristow, VA (US); Anthony B. Taylor, Stafford, VA (US); Tuyen Thanh Nguyen, Fairfax, VA (US); Scott R. Bombaugh, Burke, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 18/191,386

(22) Filed: Mar. 28, 2023

(65) Prior Publication Data

US 2023/0226862 A1    Jul. 20, 2023

Related U.S. Application Data

(60) Continuation of application No. 17/814,810, filed on Jul. 25, 2022, now Pat. No. 11,623,482, which is a division of application No. 16/903,705, filed on Jun. 17, 2020, now Pat. No. 11,433,721.

(60) Provisional application No. 62/862,896, filed on Jun. 18, 2019.

(51) Int. Cl.
*B60D 1/52* (2006.01)
*B60D 1/14* (2006.01)
*B60D 1/00* (2006.01)
*B60D 1/48* (2006.01)

(52) U.S. Cl.
CPC .......... *B60D 1/52* (2013.01); *B60D 2001/001* (2013.01); *B60D 2001/005* (2013.01); *B60D 1/14* (2013.01); *B60D 1/481* (2013.01)

(58) Field of Classification Search
CPC ................. B60D 1/481; B60D 1/52
See application file for complete search history.

(56) References Cited

U.S. PATENT DOCUMENTS

| | | |
|---|---|---|
| 3,702,018 A | 11/1972 | Wood |
| 4,786,229 A | 11/1988 | Henderson |
| 5,267,719 A | 12/1993 | Keller |
| 6,299,001 B1 | 10/2001 | Frolov et al. |
| 6,691,644 B1 | 2/2004 | Anderson |
| 6,705,523 B1 | 3/2004 | Stamm et al. |
| 6,871,714 B2 | 3/2005 | Johnson |
| 7,533,742 B2 | 5/2009 | Johnson et al. |
| 9,387,982 B1 | 7/2016 | Corey, Jr. et al. |
| 9,561,941 B1 | 2/2017 | Watts |
| 9,827,683 B1 | 11/2017 | Hance et al. |
| 9,963,331 B1 | 5/2018 | Holmberg |
| 10,000,284 B1 | 6/2018 | Purwin et al. |
| 10,539,266 B2 | 1/2020 | Will et al. |
| 10,772,444 B2 | 9/2020 | Stas |

(Continued)

FOREIGN PATENT DOCUMENTS

| | | |
|---|---|---|
| DE | 202021000626 U1 | 3/2021 |
| EP | 3392119 A1 | 10/2018 |

*Primary Examiner* — Kevin Hurley
(74) *Attorney, Agent, or Firm* — Knobbe, Martens, Olson & Bear, LLP (57) ABSTRACT

This disclosure relates to systems and methods of towing, hitching, and connecting devices. In particular, this disclosure relates to tow devices, hitches, and connections for towing item containers behind vehicles, both autonomous and manually guided.

20 Claims, 10 Drawing Sheets

(56) References Cited

U.S. PATENT DOCUMENTS

| | | |
|---|---|---|
| 11,027,640 B2 | 6/2021 | Schwartz et al. |
| 11,028,609 B2 | 6/2021 | Sargent |
| 11,034,282 B2 | 6/2021 | Barlow |
| 11,086,336 B1 | 8/2021 | Bolotski et al. |
| 2006/0273547 A1 | 12/2006 | Holtan et al. |
| 2013/0054129 A1 | 2/2013 | Wong et al. |
| 2014/0074341 A1 | 3/2014 | Weiss |
| 2015/0032252 A1 | 1/2015 | Galluzzo et al. |
| 2015/0158517 A1 | 6/2015 | Hasan |
| 2016/0176638 A1 | 6/2016 | Toebes |
| 2016/0189098 A1 | 6/2016 | Beaurepaire et al. |
| 2017/0278051 A1 | 9/2017 | Cohn |
| 2017/0283171 A1 | 10/2017 | High et al. |
| 2017/0297820 A1 | 10/2017 | Grinnell et al. |
| 2018/0032949 A1 | 2/2018 | Galluzzo et al. |
| 2018/0096299 A1 | 4/2018 | Jarvis et al. |
| 2018/0120465 A1 | 5/2018 | Rose et al. |
| 2018/0127212 A1 | 5/2018 | Jarvis et al. |
| 2018/0137454 A1 | 5/2018 | Kulkarni et al. |
| 2018/0137458 A1 | 5/2018 | Repensek |
| 2018/0215544 A1 | 8/2018 | High et al. |
| 2018/0222262 A1 | 8/2018 | Vetkos |
| 2018/0276604 A1 | 9/2018 | Gariepy et al. |
| 2018/0307941 A1 | 10/2018 | Holz et al. |
| 2019/0005741 A1 | 1/2019 | Klausner et al. |
| 2019/0064845 A1 | 2/2019 | Pardasani et al. |
| 2019/0193629 A1 | 6/2019 | Zevenbergen et al. |
| 2019/0196505 A1 | 6/2019 | High et al. |
| 2019/0210849 A1 | 7/2019 | High et al. |
| 2019/0228375 A1 | 7/2019 | Laury et al. |
| 2019/0310645 A1 | 10/2019 | Wu et al. |
| 2020/0034780 A1 | 1/2020 | Sikka et al. |
| 2020/0061927 A1 | 2/2020 | Millhouse et al. |
| 2020/0122831 A1 | 4/2020 | Rivaya |
| 2020/0207167 A1 | 7/2020 | Goncalves et al. |
| 2020/0207250 A1 | 7/2020 | Jarvis et al. |
| 2020/0216299 A1 | 7/2020 | Johnson |
| 2020/0231185 A1 | 7/2020 | Shiu et al. |
| 2020/0231386 A1 | 7/2020 | Shiu et al. |
| 2020/0242544 A1 | 7/2020 | Galluzzo et al. |
| 2020/0398620 A1 | 12/2020 | Shiu et al. |
| 2021/0017007 A1 | 1/2021 | Houston et al. |
| 2021/0170817 A1 | 6/2021 | Smith |
| 2022/0234403 A1 | 7/2022 | Ward |

HITCHES AND CONNECTIONS FOR AUTOMATED GUIDED VEHICLE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57. This application is a continuation of U.S. patent application Ser. No. 17/814,810, filed Jul. 25, 2022, which is a divisional of U.S. patent application Ser. No. 16/903,705, now U.S. Pat. No. 11,433,721, filed Jun. 17, 2020, which claims the benefit of priority to U.S. provisional application 62/862,896, filed Jun. 18, 2019, the entire contents of each of which are hereby incorporated by reference.

BACKGROUND

This disclosure relates to systems and methods of towing, hitching, and connecting devices. In particular, this disclosure relates to tow devices, hitches, and connections for towing item containers behind vehicles, both autonomous and manually guided.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the described features provide advantages that include towing and connections.

In some variants, a tow hitch is disclosed herein that can releasably couple to a wire container. The tow hitch can include a main body. The main body can have a front face, a top side, and/or a bottom side. The tow hitch can include a hitch receiver that can be disposed on the front face. The tow hitch can include at least one top flange that can be disposed on the top side of the main body. The tow hitch can include at least one small flange that can be disposed on the top side of the main body proximate the at least one top flange. The tow hitch can include at least one bottom flange that can be disposed on a bottom side of the main body opposite the at least one top flange.

In some variants, the tow hitch can include at least one support structure. The at least one support structure can be coupled to the front face of the main body and the hitch receiver. The at least one support structure can extend in a transverse direction from a longitudinal direction of the hitch receiver.

In some variants, the hitch receiver can be formed having an aperture formed therein. The aperture can extend a length of the hitch receiver.

In some variants, a portion of a perimeter of the aperture can be defined by the front face of the main body.

In some variants, the at least one top flange can include a first vertical portion, a horizontal portion, and/or a second vertical portion. The first vertical portion can be coplanar with the front face of the main body. The horizontal portion can extend perpendicularly from the first vertical portion. The second vertical portion can extend perpendicularly from the horizontal portion such that the second vertical portion is parallel to and offset from the first vertical portion.

In some variants, the tow device can include two top flanges spaced apart from each other.

In some variants, the two top flanges can be horizontally spaced apart such that the two top flanges and two bottom flanges can fit in spaces between adjacent vertical wires of a wire container.

In some variants, the at least one bottom flange can include a horizontal portion and a vertical portion. The horizontal portion can extend perpendicularly from the bottom side of the main body. The vertical portion can extend perpendicularly from the horizontal portion.

In some variants, the tow hitch can include two bottom flanges that can be spaced apart from each other.

In some variants, the at least one small flange can include a single member that can extend away at an angle from a front face of the main body.

In some variants, the at least one small flange can secure the tow hitch to a wire container with a snap fit. The at least one small flange can snap under a third horizontal wire of the wire container when a force is applied to the tow hitch, which can result in a first horizontal wire applying a force against the at least one top flange and the third horizontal wire applying a force against the at least one small flange.

In some variants, a tow hitch is disclosed herein that can releasably couple to a wire container. The tow hitch can include a main body. The main body can have a first end and a second end. The tow hitch can include a hitch receiver that can be disposed on the first end. The tow hitch can include a locking member. The locking member can include an actuator that can selectively move from a locked position to an unlocked position. The tow hitch can include two flanges that can be disposed on the second end of the main body. The tow hitch can include two small flanges that can be disposed on the bottom surface of the main body and at the second end.

In some variants, a hook can be disposed on a surface of the main body such that the tow device can be hung for storage.

In some variants, the hitch receiver can include a cylindrical cross section.

In some variants, the hitch receiver can be formed having an aperture therein that extends a length of the hitch receiver.

In some variants, the two flanges can each include a horizontal portion that can be parallel to a bottom surface of the main body.

In some variants, the two small flanges can each include a single member that can extend away from the bottom surface at an angle.

In some variants, the actuator of the locking member can selectively change between a lock position and unlock position. An engagement portion of the locking member can interface with a mating portion of a tow device when the actuator is changed to the lock position. The engagement portion of the locking member may not interface with the mating portion of a tow device when the actuator is changed to the unlock position.

In some variants, the hitch receiver can extends through the main body.

In some variants, the first end of the main body can be narrower than the second end of the main body.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIGS. 1D-1 illustrates a front perspective view of the example tow hitch of FIG. 1A coupled to wires of an item container.

FIGS. 1D-2 illustrates a back perspective view of the example tow hitch of FIG. 1A coupled to wires of an item container.

DETAILED DESCRIPTION

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

The quantity of items, such as packages and parcels, being delivered to homes and businesses is rising. Often large quantities of items need to be moved quickly and efficiently. Consequently, distribution networks, such as the United States Postal Service (USPS), sometimes use vehicles to tow one or more item containers, such as rigid and collapsible wire containers, pallets, wheeled shelves, bins, pouches, bags, containers, and rolling stock to move large quantities of items in an efficient manner. Item containers can lack adequate hitches and/or hitch connections. Wire item containers can lack hitches and/or connections at desirable locations. Wire item containers, tow devices, hitches, and/or connectors can be damaged if an inadequate hitch and/or hitch connection is used, a hitch and/or hitch connection is positioned at an undesirable location, or hitch and/or hitch connections are nonexistent. Accordingly, distribution networks can use hitches disclosed herein to quickly, efficiently, safely, and securely hitch item containers to each other and towing vehicles.

Figure 1A:
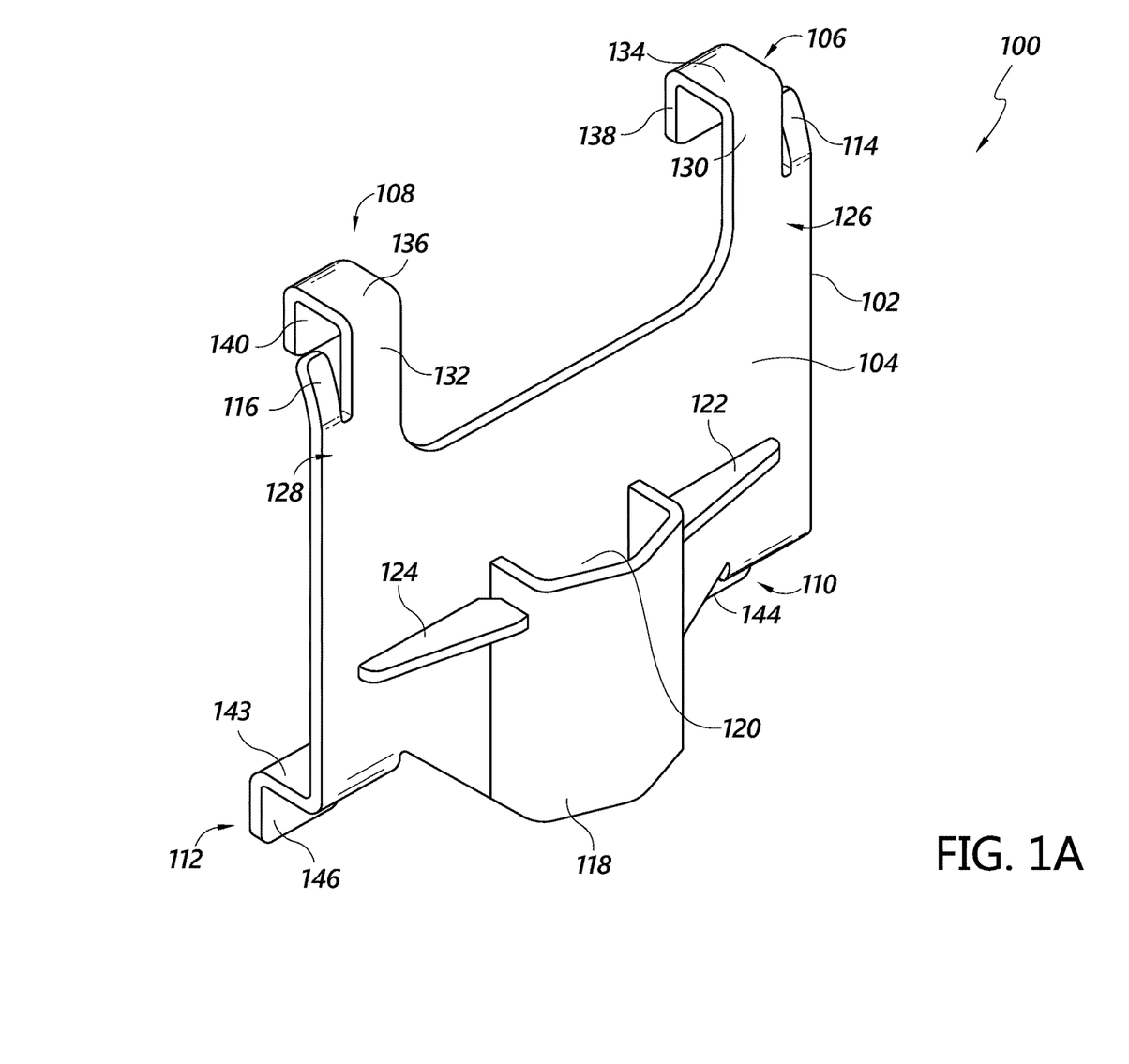
FIG. 1A illustrates a perspective view of an example tow hitch.
Figure 1B:
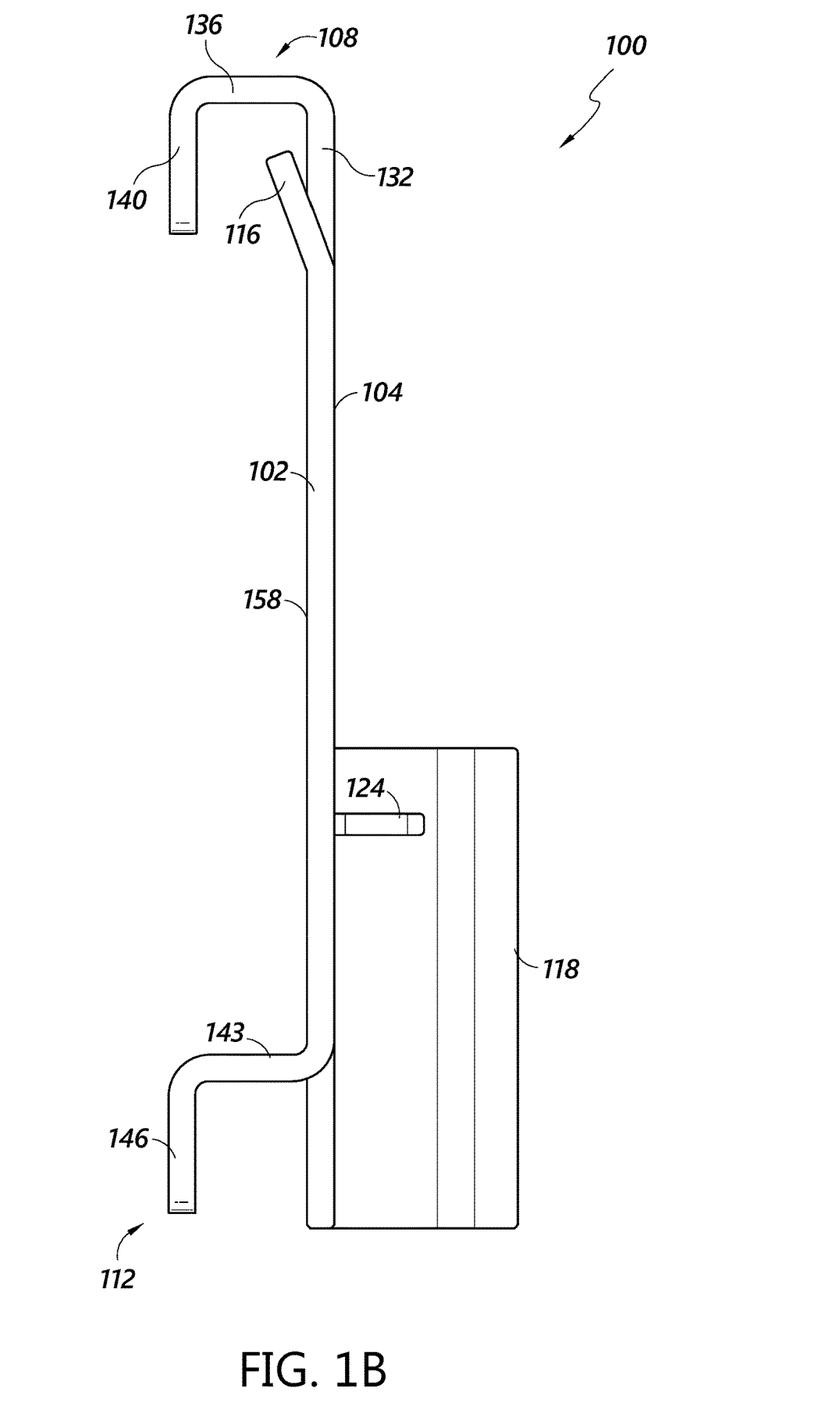
FIG. 1B illustrates a side view of the example tow hitch of FIG. 1A.
Figure 1C:
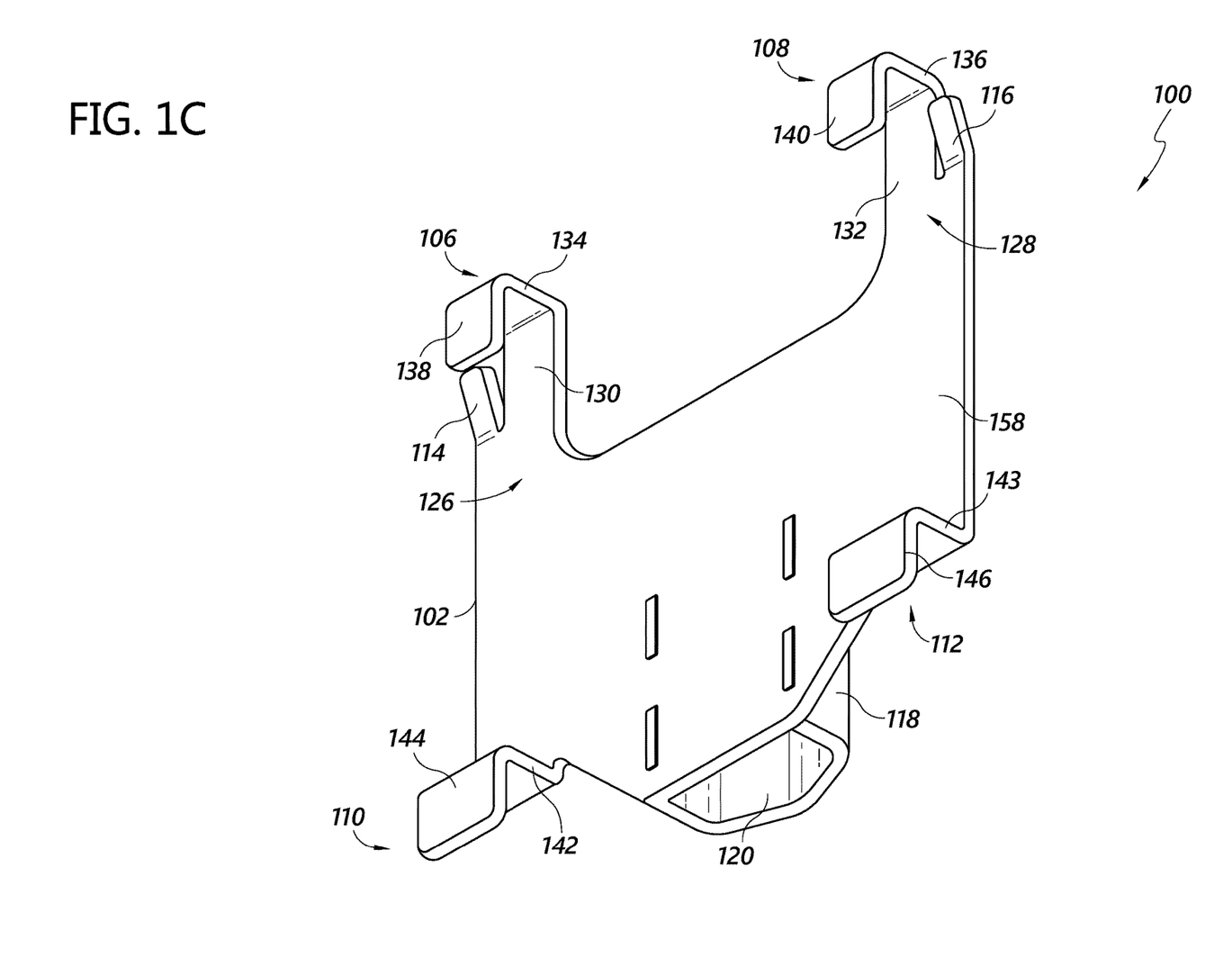
FIG. 1C illustrates a back perspective view of the example tow hitch of FIG. 1A.

FIGS. 1A-1D are illustrations of an embodiment of a tow hitch. As illustrated in FIG. 1A, tow hitch 100 can have a main body 102. The main body 102 has a front face 104. The main body 102 has, as shown in FIG. 1C, a back face 158. In some embodiments, the main body 102 is cast from metal and/or metal alloy. In some embodiments, the main body 102 is made from sheet metal, high density polyethylene, or other desired material.

A hitch receiver 118 is disposed on the front face 104. The hitch receiver 118, also referred to as a hitch pocket, includes a hitch receiver aperture 120. The hitch receiver 118 is configured to interface with the mating portion(s) of a tow device. The hitch receiver aperture 120 extends through the entire length of hitch receiver 118. In some variants, the receiver aperture 120 extends through a portion of the length of the hitch receiver. The hitch receiver 118 is a tubular, annular, or hollow structure having an interior and exterior perimeter defining a half hexagon shape. The aperture 120 is defined by an interior perimeter of hitch receiver 118 and the front face 104 of the main body 102. In some embodiments, the hitch receiver 118 and/or aperture 120 have various cross-sectional sizes and shapes, which can include a circle, polygon, and/or other suitable shape that can receive the mating portion of a tow device. It can be advantageous for the shape of the hitch receiver 118 to have a point, or a relatively tapered portion in order to index or position the tow device 100 placed within, as will be described elsewhere herein. In some embodiments, aperture 120 extends partially through hitch receiver 118. In some embodiments, the hitch receiver 118 is cast with the main body 102. In some embodiments, the hitch receiver 118 is coupled to the main body 102, which can include coupling by welding, bolting, screwing, riveting, or otherwise securing.

A first support structure 122 and second support structure 124 are disposed on the front face 104 and coupled to the hitch receiver 118. The first support structure 122 and second support structure 124 are configured to improve the structural integrity of the hitch receiver 118 and/or the tow hitch 100. The first support structure 122 and second support structure 124 can be coupled to the front face 104 and the hitch receiver 118 by welding, bolting, riveting, screwing, or otherwise securing, or can be integrally or monolithically formed with the front face 104. The portion of the first support structure 122 and second support structure 124 that couples to the hitch receiver 118 is larger than the opposing end portion of the first support structure 122 and second support structure 124. The first support structure 122 and second support structure 124 can be positioned at various positions along the exterior of the hitch receiver 118. In some embodiments, only one, more than two, or no support structures are disposed on the front face 104 and/or coupled to the hitch receiver 118.

The top portion of main body 102 includes a first arm 126 and a second arm 128. The first arm 126 and the second arm 128 are coplanar with the front face 104 and back face 158 of the main body 102. The first arm 126 and the second arm 128 have thicknesses that are equivalent to the main body 102. In some embodiments, the thickness of the first arm 126 and the second arm 128 can vary from that of the main body 102. The first arm 126 and the second arm 128 each extend vertically in a direction away from the bottom side of the main body 102. In some embodiments, the first arm 126 and the second arm 128 can extend laterally outward from the front face 104. A first top flange 106 and a first small flange 114 are positioned on the first arm 126. The second top flange 108 and second small flange 116 are positioned on the second arm 128.

The first top flange 106 and the second top flange 108 are positioned on a top side of main body 102. The first top flange 106 extends from the first arm 126. The second top flange 108 extends from the second arm 128. The first top flange 106 can be equivalent or similar to or a mirror image of the second top flange 108. The first top flange 106 has a first top vertical portion 130, first top horizontal portion 134, and first offset vertical portion 138. The first top vertical portion 130 is coplanar with the front face 104. The first top vertical portion 130 is coplanar with the first arm 126. The first top horizontal portion 134 extends perpendicularly from the first top vertical portion 130. The first top horizontal portion 134 extends in a direction opposite the front face 104. The first offset vertical portion 138 extends perpendicularly downward from the first top horizontal portion 134. The first offset vertical portion 138 is parallel and offset from the first top vertical portion 130. The first top vertical portion 130, first top horizontal portion 134, and first offset vertical portion 138 have equivalent thicknesses and widths. The thickness is the same as the thickness of the main body 102. In some embodiments, the first top vertical portion 130, first top horizontal portion 134, first offset vertical portion 138, and main body 102 have varying thicknesses.

The second top flange 108 has a second top vertical portion 132, second top horizontal portion 136, and second offset vertical portion 140. The second top vertical portion 132, second top horizontal portion 136, and second offset vertical portion 140 are configured similarly to the first top vertical portion 130, first top horizontal portion 134, and first offset vertical portion 138, as described above, but extending from the second arm 128.

The first top flange 106 and the second top flange 108 are spaced apart from each other such that the first top flange 106 and the second top flange 108 can fit between the vertical wires of a wire-sided container, sometimes referred to as a wire container. The first top flange 106 and the second top flange 108 have widths that are configured to fit between the vertical wires of a wire-sided container.

In some embodiments, the first top flange 106 and the second top flange 108 are integrally formed with the main body 102. In some embodiments, first top flange 106 and the second top flange 108 are formed by being bent into the shape described herein. The first top flange 106 and the second top flange 108 can be bent into shape with a press, sheet metal bender, sheet metal bender brake, and/or other device suitable for bending sheets or plates of metal. In some embodiments, more than two top flanges are positioned on the top side of main body 102.

A first small flange 114 and a second small flange 116 are positioned on the top side of main body 102. The first small flange 114 extends from the first arm 126. The first small flange 114 and a second small flange 116 are each, respectively, positioned proximate to the first top flange 106 or the second top flange 108. The first small flange 114 is equivalent to the second small flange 116. The first small flange 114 can have a thickness that is equivalent to the main body 102. The first small flange 114 extends away from the main body 102 and/or first arm 126 at an angle. In some embodiments, the angle between the front face 104 and the first small flange 114 can be any angle between 0-180 degrees. In some embodiments, the first small flange 114 defines an angle between the first vertical portion 130 and the first small flange 114 that includes any angle between 0-90 degrees. The second small flange 116 is configured similarly to the first small flange 114, as described above, but extending from the second arm 128. In some embodiments, the first small flange 114 and a second small flange 116 can be integrally formed with the main body 102. In some embodiments, the first small flange 114 and a second small flange 116 are bent into shape. The first small flange 114 and a second small flange 116 can be bent into shape with a press, sheet metal bender, sheet metal bender brake, and/or other device suitable for bending sheets or plates of metal. In some embodiments, more than two small flanges are positioned on the back face 158 and/or first arm 126 and second arm 128 of main body 102.

FIG. 1B shows a side view of the tow hitch 100. The side view provides a view of several features of the tow hitch 100, described herein. FIG. 1C shows a first bottom flange 110 and a second bottom flange 112 positioned on a bottom side of the main body 102, which is the side opposite the first top flange 106 and the second top flange 108. The first bottom flange 110 can be similar to the second bottom flange 112. The first bottom flange 110 has a first bottom horizontal portion 142 and first bottom vertical portion 144. The first bottom horizontal portion 142 extends perpendicularly from the bottom side of main body 102 in a direction opposite the front face 104. The first bottom vertical portion 144 extends perpendicularly downward from the first bottom horizontal portion 142. The first bottom vertical portion 144 extends in a direction such that the first bottom vertical portion 144 is not offset from the main body 102. The first horizontal bottom portion 142 and the first bottom vertical portion 144 have equivalent thicknesses and widths. The thickness is the same as the thickness of the main body 102. In some embodiments, the first horizontal bottom portion 142, the first bottom vertical portion 144, and the main body 102 have varying thicknesses.

The second bottom flange 112 has a second bottom horizontal portion 143 and second bottom vertical portion 146. The second bottom horizontal portion 143 and the second bottom vertical portion 146 are configured as the first bottom horizontal portion 142 and the second bottom vertical portion 144, as described above. The first bottom flange 110 and the second bottom flange 112 are spaced apart from each other such that the first bottom flange 110 and the second bottom flange 112 fit between the vertical wires of a wire-sided container.

In some embodiments, the first bottom flange 110 and the second bottom flange 112 are integrally formed with the main body 102. In some embodiments, the first bottom flange 110 and the second bottom flange 112 are bent into shape. The first bottom flange 110 and the second bottom flange 112 can be bent into shape with a press, sheet metal bender, sheet metal bender brake, and/or other device suitable for bending sheets or plates of metal. In some embodiments, more than two bottom flanges are positioned on the bottom side of main body 102. In some embodiments, the first bottom flange 110 and the second bottom flange 112 have a width configured to fit between the vertical wires of a wire item container.

Figure 1D:
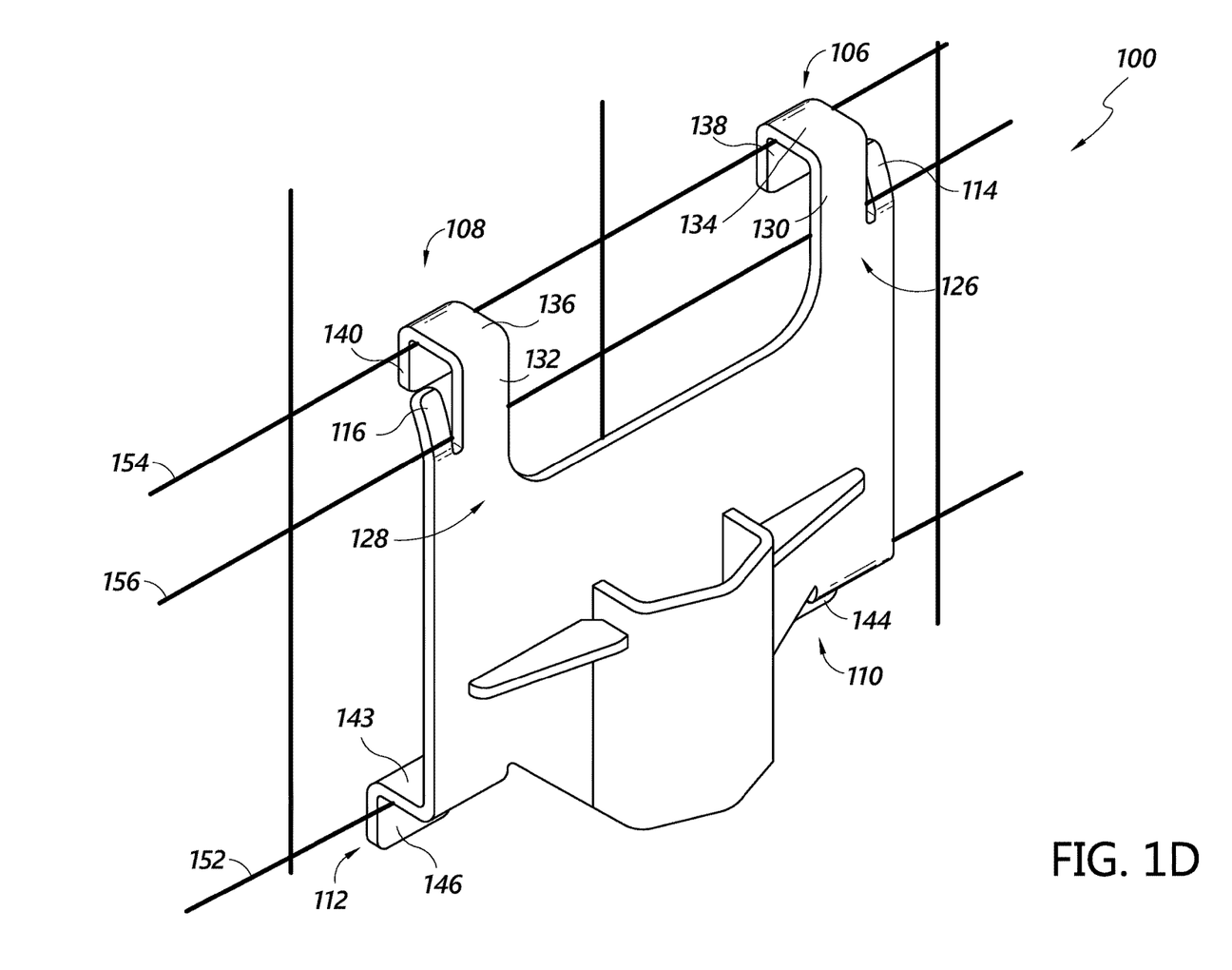
FIG. 1D illustrates a perspective view of the example tow hitch of FIG. 1A coupled to wires of an item container.
Figure 1D:
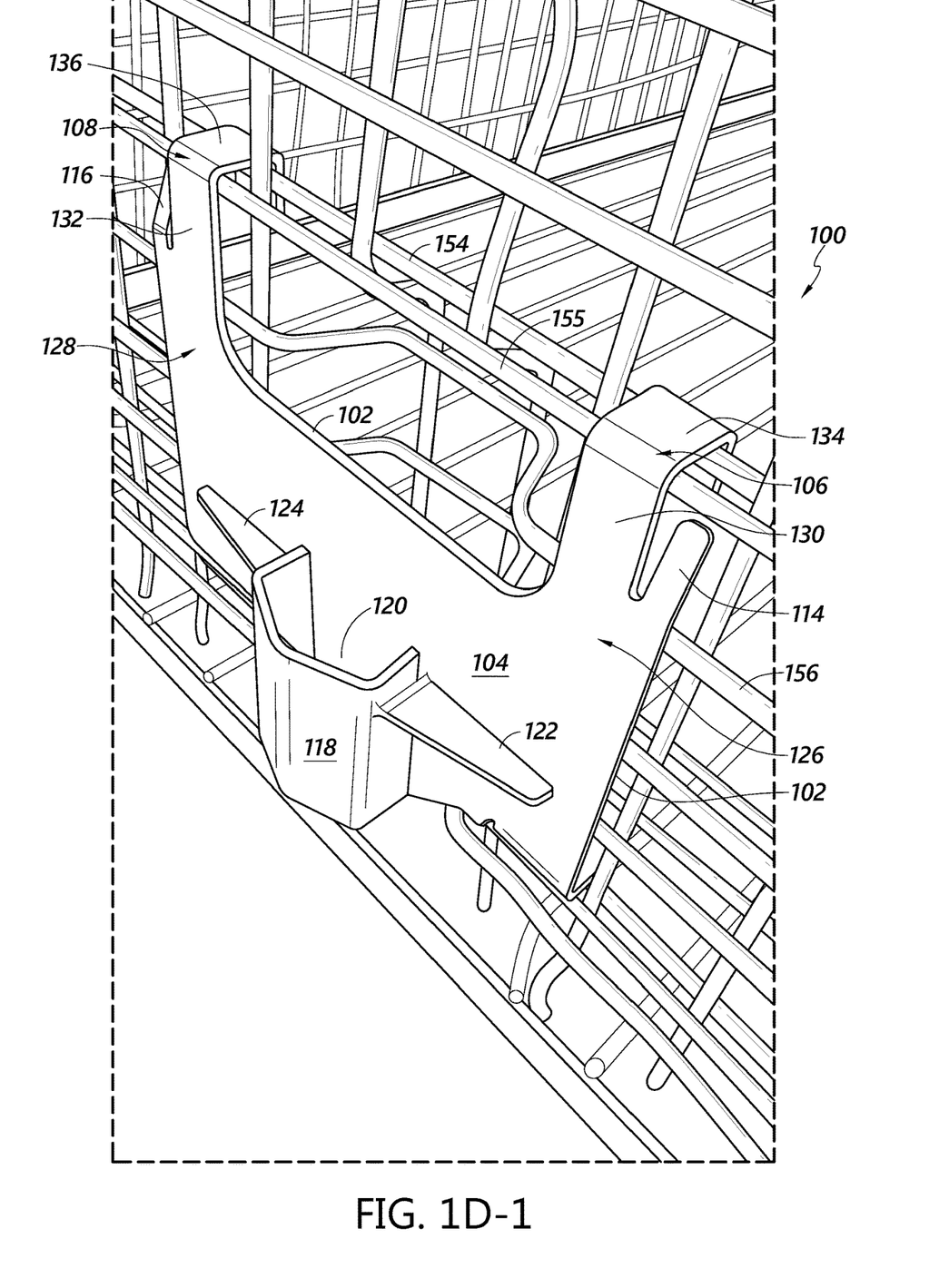
Figure 1D:
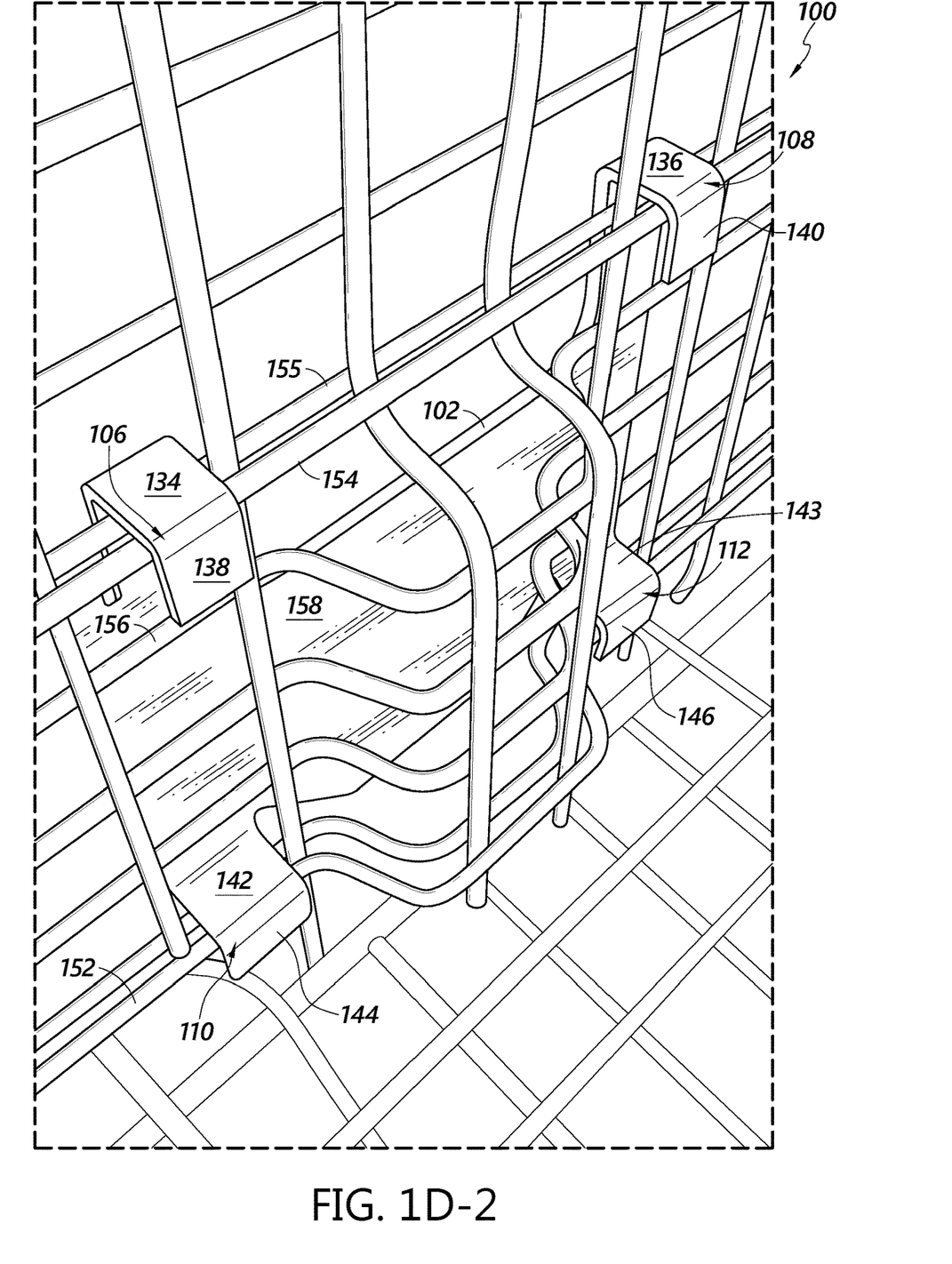

FIG. 1D illustrates tow hitch 100 attached to the wires of an item container. The wire item container has a bottom inner-horizontal wire 152, a top inner-horizontal wire 154, an outer-horizontal wire 156, and vertical wires. To secure the tow hitch 100 to the wires, the first bottom flange 110 and second bottom flange 112 are placed over and behind the bottom inner-horizontal wire 152 and between any vertical wires. The first bottom flange 110 and second bottom flange 112 are positioned such that the bottom inner-horizontal wire 152 is positioned below the first bottom horizontal portion 142 and second bottom horizontal portion 143, and in front of the first bottom vertical portion 144 and the second bottom vertical portion 146. The first top flange 106 and the second top flange 108 are clipped over the top inner-horizontal wire 154 and between any vertical wires. The first top flange 106 and the second top flange 108 are positioned such that the top inner-horizontal wire 154 is positioned below the first top horizontal portion 134 and the second top horizontal portion 136, between the first top vertical portion 130 and first offset vertical portion 138, and between the second top vertical portion 132 and the second offset vertical portion 140.

Once the first bottom flange 110, second bottom flange 112, first top flange 106, and second top flange 108 are positioned as described above, the tow hitch 100 can be configured to snap-fit to the wire item container. Applying a downward force on the tow hitch 100 causes the first small flange 114 and the second small flange 116 to snap under the outer-horizontal wire 156 such that the outer-horizontal wire 156 is positioned in the angle defined between the first small flange 114 and the first top vertical portion 130 and the angle defined between the second small flange 116 and the second top vertical portion 132. A user can apply a downward force to the tow hitch 100 by stepping on or otherwise applying a downward force to the hitch receiver 118. This applied force can result in the tow hitch being positioned on a wire container as described above. In the mounted configuration illustrated in FIG. 1D, the top inner-horizontal wire 154 applies an upward force against the first top horizontal portion 134 and the second top horizontal portion 136 and/or the first offset vertical portion 138 and second offset vertical portion 140. The outer-horizontal wire 156 applies a downward force against the first small flange 114 and the second small flange 116 and/or the first top vertical portion 130 and the second top vertical portion 132. This results in a snap fit that secures the tow hitch 100 to the wires of the item container.

The tow hitch 100 can be decoupled from the snap-fit described above by prying the first small flange 114 and the second small flange 116 free from under the outer-horizontal wire 156. A user can pry the first small flange 114, or second small flange 116, out from under the outer-horizontal wire 156 with a standard (flat-head) screwdriver. In some embodiments, a user can place the tip of the standard screwdriver between the top surface of the first small flange 114 and the outer-horizontal wire 156 and pry upward. Prying upward will bend the first small flange 114, releasing the side of the tow hitch 100 upon which the first small flange 114 is disposed. The user can repeat the process described above for the second small flange 116. Once the first small flange 114 and the second small flange 116 are freed from under outer-horizontal wire 156, a user can pull upward on the tow hitch 100 to decouple it completely from the wire-sided container.

FIGS. 1D-1 through 1D-2 illustrate tow hitch 100 coupled to the wires of an item container but with the differences highlighted below. The wire item container has the bottom inner-horizontal wire 152, the top inner-horizontal wire 154, the outer-horizontal wire 156, a second outer-horizontal wire 155, and vertical wires. To secure the tow hitch 100 to the wires, the first bottom flange 110 and second bottom flange 112 are placed over and behind the bottom inner-horizontal wire 152 and between any vertical wires, as shown in FIGS. 1D-2. The first bottom flange 110 and second bottom flange 112 are positioned such that the bottom inner-horizontal wire 152 is positioned below the first bottom horizontal portion 142 and second bottom horizontal portion 143 and in front of the first bottom vertical portion 144 and the second bottom vertical portion 146. The first top flange 106 and the second top flange 108 are clipped over the top inner-horizontal wire 154 and the second outer-horizontal wire 155 and between the vertical wires. The first top flange 106 and the second top flange 108 are positioned such that the top inner-horizontal wire 154 and second outer-horizontal wire 155 are positioned below the first top horizontal portion 134 and the second top horizontal portion 136, between the first top vertical portion 130 and first offset vertical portion 138, and between the second top vertical portion 132 and the second offset vertical portion 140. As shown in FIGS. 1D-1, the first small flange 114 and the second small flange 116 are not snap-fitted under the outer-horizontal wire 156 as is described in reference to FIG. 1D. Instead, the first small flange 114 and the second small flange 116 are positioned in front of and above the outer-horizontal wire 156. To decouple the tow hitch 100 from the item container, a user can lift the tow hitch 100 up and away from the item container such that the first bottom flange 110, second bottom flange 112, first top flange 106, and second top flange 108 are free.

Figure 1E:
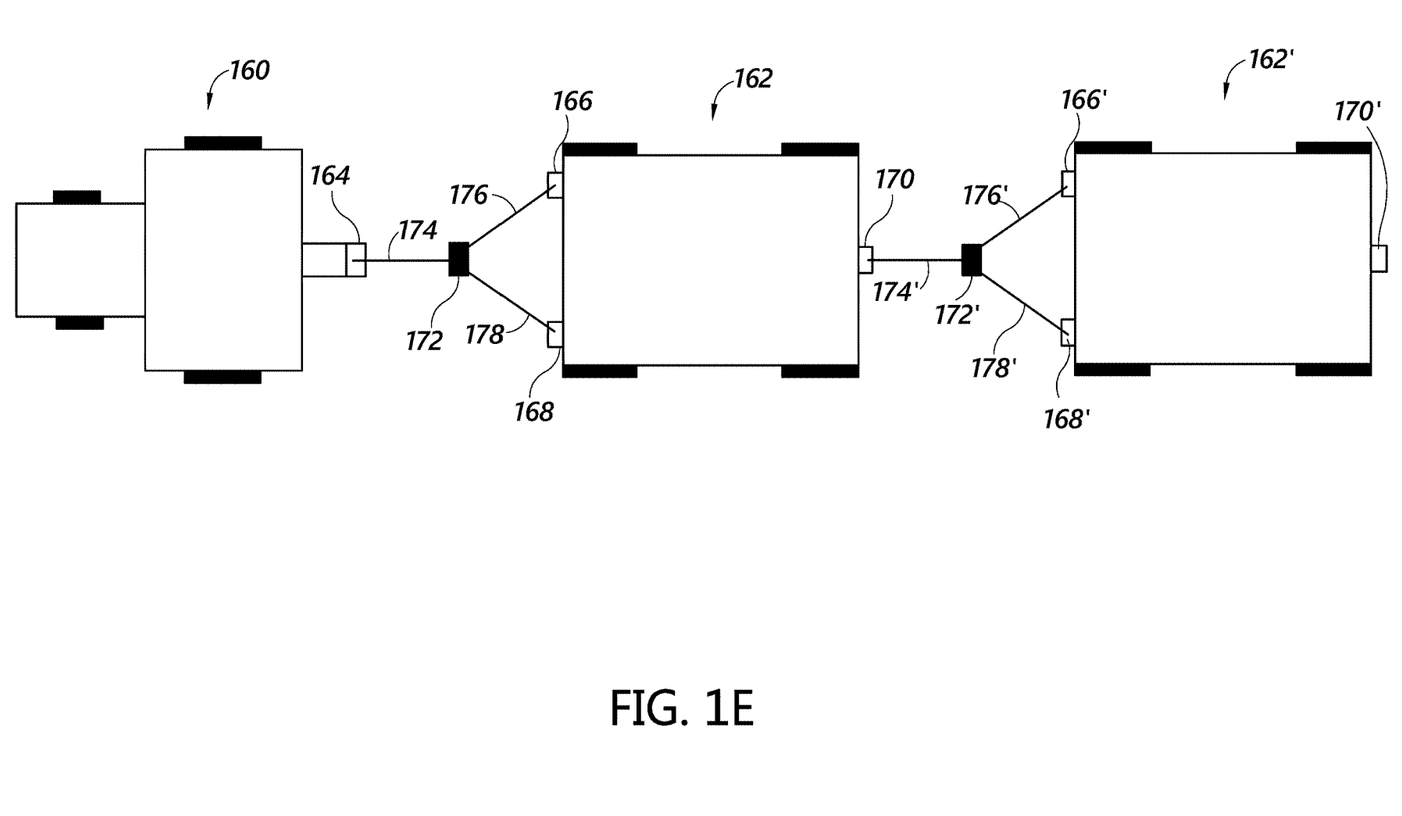
FIG. 1E illustrates example tow hitches being used to tow wire containers behind a vehicle.

FIG. 1E illustrates a vehicle towing multiple item containers using tow hitches. The vehicle 160 can be a powered industrial vehicles (PIV) such as an automated guided vehicles (AGV) or tugs or other suitable vehicle. The vehicle 160 can tow a first container 162 by using a first front tow hitch 166, second front tow hitch 168, and a tow device 172. The first front tow hitch 166 and second front tow hitch 168 are coupled to the front of the first container 162 spaced apart from each other, and relatively nearer the edges of the first container 162. A first tow device 172 is used to couple the vehicle 160 to the first container 162. The first tow device 172 has a fixed leg 174, first leg 176, and a second leg 178. The fixed leg 174 mates with the vehicle tow hitch 164. The first leg 176 mates with the first front tow hitch 166. The second leg 178 mates with the second front tow hitch 168. The vehicle 160 can tow the first container 162 in this configuration. In some embodiments, only the first front tow hitch 166 is coupled to the front of the first container 162, and a tow device couples the vehicle tow hitch 164 to the singular first front tow hitch 166 for towing. In some embodiments, the tow device 172 can be similar to the tow device described in U.S. Provisional Patent Application No. 62/853,366 entitled Tow Device for Automated Guided Vehicle and filed May 28, 2019, and/or U.S. patent application Ser. No. 16/883,132 entitled Tow Device for Automated Guided Vehicle and filed May 26, 2019, the entire contents of which are herein incorporated by reference.

A second container 162' can be towed in a similar manner. A back tow hitch 170 is coupled to the back of the first container 162 at or near a midpoint of the back edge of the container 162. A second tow device 172' is used to couple the first container 162 to the second container 162'. The fixed leg 174' mates with the back tow hitch 170 of the first container 162. As described above, the shape of the hitch receiver 118 causes the mating portion of the fixed leg 174' to be positioned in the narrow part of the hitch receiver 118, in order to center the fixed leg 174' in the center of the back edge of the first container 162 when a pulling force is applied. Centering the fixed leg 174' of the second tow device 172' ensures that the pulling force is applied to the center of the back edge to ensure efficient, safe, and controllable pulling. The first leg 176' mates with the first front tow hitch 166'. The second leg 178' mates with the second front tow hitch 168'. A train of item containers can be connected and towed in the manner described above. In some embodiments, two, three, or more item containers can be towed behind a single vehicle 160. Using the tow hitch 160 described herein ensures that the wire-sided item containers are not damaged when using the tow bars 172, and provides for safe and efficient operation.

Each of the components, features, and/or characteristics described above in reference to FIGS. 1A-1E can be made of various materials, which can include metals, metal alloys, polymers, carbon fiber, ceramics, and/or other suitable materials.

Figure 2A:
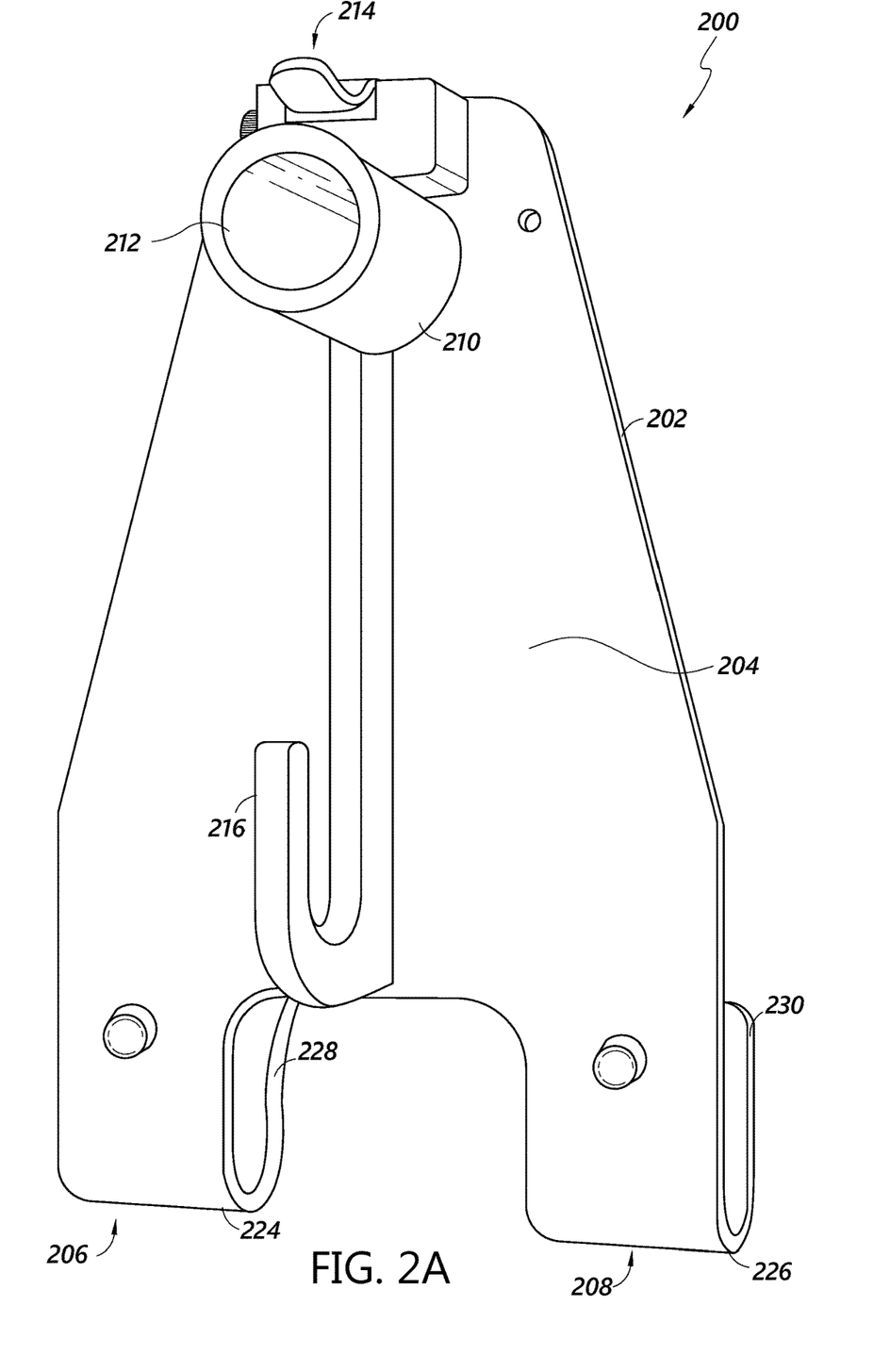
FIG. 2A illustrates a top view of another example tow hitch.
Figure 2B:
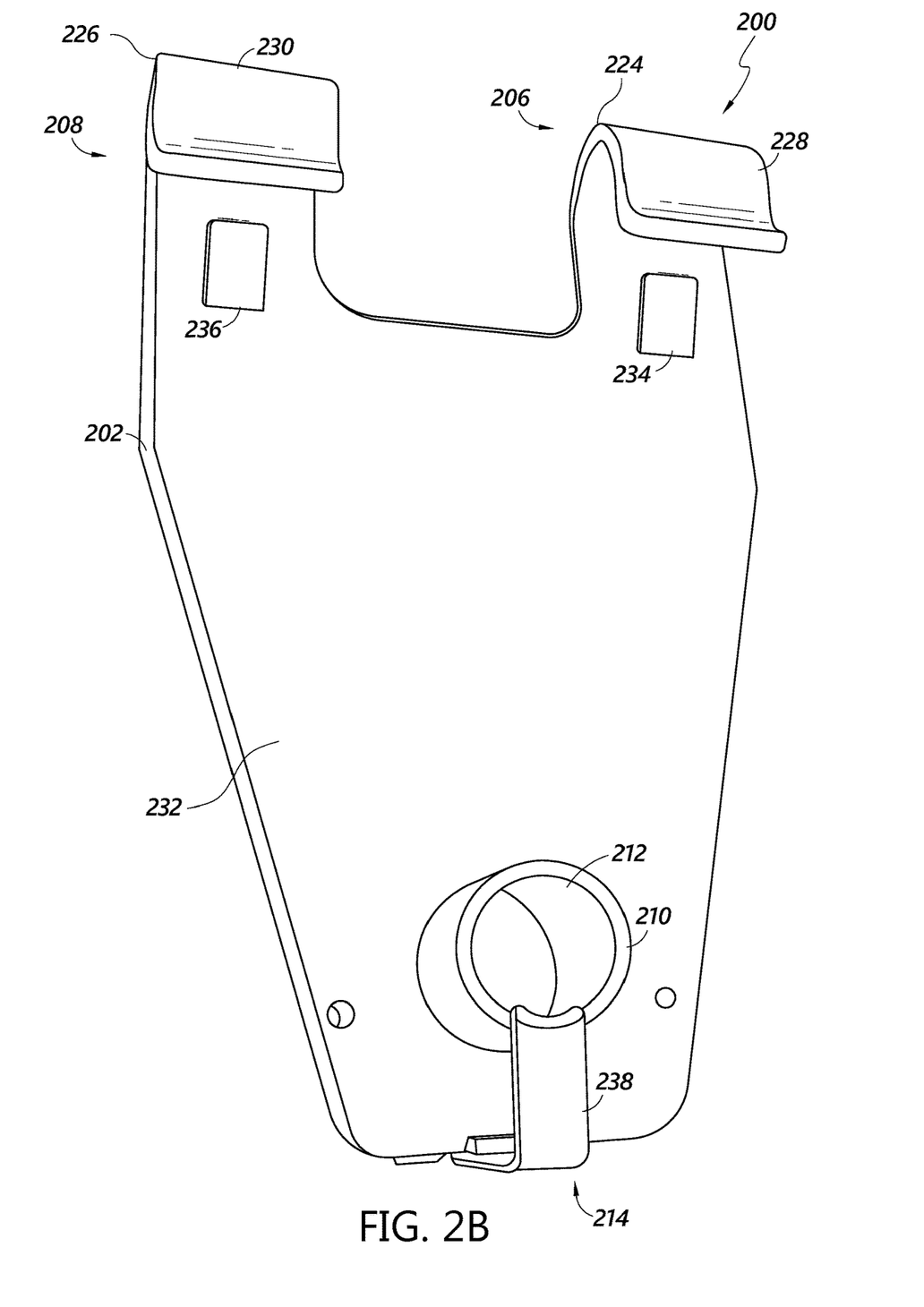
FIG. 2B illustrates a bottom view of the example tow hitch of FIG. 2A.
Figure 2C:
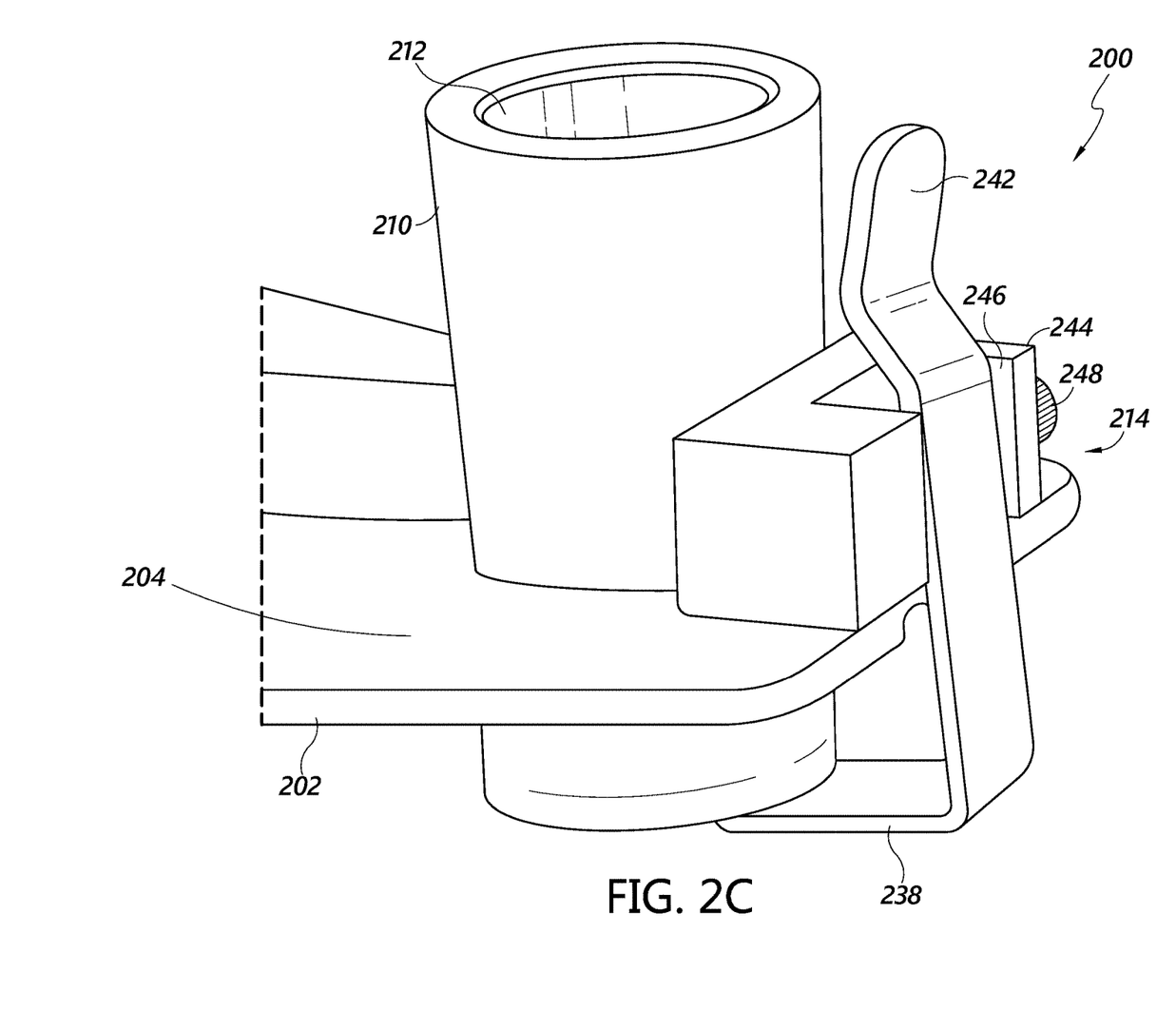
FIG. 2C illustrates a portion of the example tow hitch of FIG. 2A.

FIGS. 2A-2C are illustrations of an embodiments of a tow hitch. FIG. 2A shows a tow hitch 200 with a main body 202. The main body 202 has a top face 204. The main body 202 has, as shown in FIG. 2B, a bottom face 232.

A hitch receiver 210 is positioned proximate an end of the main body 202. The main body 202 gradually becomes narrower in width toward the side of the main body 202 with the hitch receiver 210. The hitch receiver 210 has a hitch receiver aperture 212 formed therein. The hitch receiver 210 is configured to interface with the mating portion of a tow device by inserting the mating portion of a tow device into the hitch receiver aperture The hitch receiver 210 is sized and shaped to receive a mating component of a tow device, as will be described elsewhere herein. In some embodiments, the hitch receiver 210 can be a cylindrical shape with an annular hitch receiver aperture 212 formed therein, in order to receive a cylindrical mating component of the tow device. The hitch receiver aperture 212 extends the entire length of hitch receiver 210. In some embodiments, the hitch receiver aperture 212 can extend along only a portion of the length of hitch receiver 210. As shown in FIG. 2C, the hitch receiver 210 extends through the main body 202. A larger portion of the hitch receiver 210 is positioned on the top face 204 side of the main body 202. In some embodiments, a larger portion of the hitch receiver 210 is on the bottom face 232 side of the main body 202. In some embodiments, an equal portion of the hitch receiver 210 is on the top face 204 and the bottom face 232 sides of the main body 202.

As shown in FIG. 2A, a hook 216 is positioned on the top face 204 of the main body 202. The hook 216 is configured to allow the tow hitch 200 to be hung in storage. An extrusion extends from the hook 216 to the hitch receiver 210. The hook 216 is oriented such that a free end of the hook 216 extends generally toward the direction of the hitch receiver 210.

As shown in FIGS. 2A and 2B, a first large flange 206 and a second large flange 208 are be positioned on an end of the main body 202 opposite the hitch receiver 210. The first large flange 206 has a first curve 224 and a first horizontal portion 228. The first curve 224 extends from the main body 202, forming a semicircle profile. The first horizontal portion 228 extends from the end of the first curve 224 such that the first horizontal portion 228 is parallel and offset from the bottom face 232 of main body 202.

A second large flange 208 can have a second curve 226 and second horizontal portion 230. The second curve 226 and second horizontal portion 230 are configured equivalently or similarly to the first curve 224 and first horizontal portion 228 described above.

The first large flange 206 and the second large flange 208 have thicknesses that are the same as the main body 202. The first large flange 206 and the second large flange 208 are offset from each other. The first large flange 206 and the second large flange 208 are parallel to each other. The first large flange 206 and the second large flange 208 are spaced apart such that the first large flange 206 and the second large flange 208 fit between the vertical wires of a wire item container. The first large flange 206 and the second large flange 208 have widths configured to enable the first large flange 206 and the second large flange 208 to fit between the vertical wires of a wire item container.

As shown in FIG. 2B, a first small bottom flange 234 and a second small bottom flange 236 are positioned on the bottom face 232 of the main body 120. The first small bottom flange 234 and a second small bottom flange 236 are positioned on the bottom face 232 such that the first small bottom flange 234 and a second small bottom flange 236 are fully or partially located, respectively opposite the first horizontal portion 228 and second horizontal portion 230. The first small bottom flange 234 and a second small bottom flange 236 each have one end coupled to the bottom face 232 and another free end extending away from the bottom face 232 at an angle. In some embodiments, the angle between the bottom face 232 and the first small bottom flange 234 and a second small bottom flange 236 is 0-180 degrees, as desired.

As shown in FIGS. 2A-2C, a locking member 214 is positioned proximate the hitch receiver 210. The locking member 214 interfaces with the hitch receiver 210. The locking member 214 can selectively lock a mating portion of a tow device that is interfacing with the hitch receiver 210 such that the mating portion cannot inadvertently be removed or resists inadvertent removal.

As shown in FIG. 2C, the locking member 214 has an engagement portion 238, an actuator 242, and a support 244. Movement of the actuator 242 between a locked position and unlocked position moves the engagement portion 238 between a locked position and an unlocked position. In the locked position, the engagement portion 238 extends over the aperture 212. In the unlocked position, the engagement portion 238 is retracted to not extend over the aperture 212. In some embodiments, the actuator 242 acts as a lever and the support 244 acts as a fulcrum. A user can manipulate the end of the actuator 242 to move the engagement portion 238 to the unlocked position. A user can manipulate the end of actuator 242 to move the engagement portion to the locked position. The end of the actuator 242 is a tab that can be pushed and/or grasped by a user. The support 244 can include a recess 246 to enable the actuator 242 to rotate to move the engagement portion 238 between unlocked and locked positions.

The engagement portion 238 interfaces with the mating portion of a tow device that is mating with the hitch receiver aperture 212 of the hitch receiver 210 when the engagement portion 238 is in the locked position. As shown in FIG. 2B, the engagement portion 238 is a horizontal member with an end configured to interface with the mating portion of a tow device. In some embodiments, the end portion of the engagement portion 238 is configured to interface with a recessed region of a mating portion of a tow device. For example, the mating portion of a tow device can have a cylindrical shape with a annular recess. In the locked position, the engagement portion 238 interfaces with the recess of the mating portion of a tow device. In the unlocked position, the engagement portion 238 is removed from the recess of the mating portion of the tow device. The locking member 214 engages the mating portion of the tow device in order to prevent the mating portion from being removed from the hitch receiver aperture 212 during towing operations.

In some embodiments, the engagement portion 238 is biased in the locked position. For example, absent an external force, the engagement portion 238 remains in the locked position. In some embodiments, the engagement portion 238 is biased in the locked position by a resilient member, such as a spring. In some embodiments, the locking member 214 can be applied to the hitch receiver 118 of the embodiment of FIGS. 1A-1D described above. In some embodiments, a knob 248 can be tightened or loosened to restrict or allow movement of the engagement portion 238.

Tow hitch 200 is configured to attach to a wire item container with a snap fit. In some embodiments, the tow hitch 200 is held in place on the side of the wire item container by a pulling force applied by a tow device inserted into the hitch receiver 210. The wire container can have an inner-horizontal wire, outer horizontal wire, and vertical wires. To couple the tow hitch 200 to the wire container, the first large flange 206 and second large flange 208 are clipped around the inner-horizontal wire. A force can be applied to the tow hitch 200 such that the first small bottom flange 234 and the second small bottom flange 236 snap under the outer horizontal wire, such that the outer horizontal wire is positioned in the angle defined by the bottom face 232 and the first small bottom flange 234 and the second small bottom flange 236. The outer horizontal wire can apply a force against the bottom surface 232 and/or the first small bottom flange 234 and the second small bottom flange 236, and the inner-horizontal wire can apply a force against the first horizontal portion 228, the second horizontal portion 230, the first curve 222, and/or the second curve 224. This results in a fit that secures the tow hitch 200 to the wire container. Once secured, the tow hitch 200 extends horizontally from the wire container. The tow hitch 200 can extend horizontally from the walls of the wire container.

In some embodiments, the tow hitch 200 can be decoupled from the wire item container described above by prying the first small bottom flange 234 and the second small bottom flange 236 free from under the outer horizontal wire. The user can pry the first small bottom flange 234 and the second small bottom flange 236 out from under the outer horizontal wire with a standard (flat) screwdriver. This can be accomplished in a similar manner that was described in reference to tow hitch 100.

In use, the tow hitch 200 can be used to tow wire item containers with powered industrial vehicles in a similar manner to that described above in reference to tow hitch 100. In some embodiments, tow hitch 200 and tow hitch 100 can be used in combination to tow wire item containers.

Each of the components, features, and/or characteristics of tow hitch 200 that are similar or comparable to the features of tow hitch 100 can be varied in equivalent or similar ways, as described herein. For example, the large flanges 206, 208 of tow hitch 100 can be configured in equivalent and/or similar ways to the top flanges 106, 108 of tow hitch 200.

Each of the components, features, and/or characteristics described above in reference to FIGS. 2A-2C can be made of various materials, which can include metals, metal alloys, polymers, carbon fiber, ceramics, and/or other suitable materials The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present disclosure. This disclosure is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this disclosure be limited to the specific embodiments disclosed herein, but that it cover all modifications and alternatives coming within the true scope and spirit of the disclosure as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of releasably coupling a tow hitch to a wire container, the method comprising:
    positioning one or more primary flanges of the tow hitch around a first horizontal wire of the wire container; and
    applying a force to the tow hitch such that one or more secondary flanges of the tow hitch snaps under a second horizontal wire of the wire container so that the second horizontal wire pushes against the one or more secondary flanges and the first horizontal wire pushes against the one or more primary flanges to releasably couple the tow hitch to the wire container with the tow hitch extending horizontally from a wall of the wire container.

2. The method of claim 1, wherein the one or more primary flanges comprises two primary flanges.

3. The method of claim 1, wherein the one or more secondary flanges comprises two secondary flanges.

4. The method of claim 1, wherein the force applied to the tow hitch is a pulling force.

5. The method of claim 4, wherein the pulling force is applied with a tow device inserted into a hitch receiver of the tow hitch.

6. The method of claim 5, further comprising locking the tow device in the hitch receiver.

7. The method of claim 5, further comprising moving an actuator of a lock of the tow hitch in a direction to permit the insertion of the tow device into the hitch receiver and releasing the actuator of the lock to engage the lock with the tow device.

8. The method of claim 7, wherein the lock is biased toward a locked configuration.

9. The method of claim 7, further comprising unlocking the tow device from the tow hitch by moving the actuator in the direction to disengage the lock from the tow device.

10. The method of claim 1, further comprising decoupling the tow hitch from the wire container by prying the one or more secondary flanges out from under the second horizontal wire.

11. The method of claim 10, wherein prying the one or more secondary flanges out from under the second horizontal wire is performed with a flathead screwdriver.

12. The method of claim 1, wherein positioning the one or more primary flanges around the first horizontal wire comprises positioning the first horizontal wire at a curve of the one or more primary flanges, the curve connecting a horizontal portion of the one or more primary flanges and a main body of the tow hitch.

13. The method of claim 12, wherein the one or more secondary flanges extends away from the main body at an angle toward the one or more primary flanges.

14. A method of releasably coupling a tow hitch to a wire container, the method comprising:
    positioning one or more lower flanges of the tow hitch behind a first horizontal wire of the wire container;
    hanging one or more upper flanges of the tow hitch over a second horizontal wire of the wire container; and
    applying a force to the tow hitch such that one or more secondary flanges snap under a third horizontal wire so that the second horizontal wire pushes up against the one or more upper flanges and the third horizontal wire pushes down on the one or more secondary flanges.

15. The method of claim 14, wherein the one or more lower flanges comprises two lower flanges.

16. The method of claim 14, wherein the one or more upper flanges comprises two upper flanges.

17. The method of claim 14, wherein the one or more secondary flanges comprises two secondary flanges.

18. The method of claim 14, wherein applying the force to the tow hitch comprises stepping on the tow hitch.

19. The method of claim 18, wherein stepping on the tow hitch comprises stepping on a hitch receiver of the tow hitch.

20. The method of claim 12, wherein applying the force to the tow hitch comprises applying a downward force.

* * * * *